United States Patent [19]

McLane

[11] Patent Number: 4,835,952
[45] Date of Patent: Jun. 6, 1989

[54] LAWN MOWER HEIGHT ADJUSTMENT LINKAGES

[76] Inventor: Frank E. McLane, 309 Regatta Way, Seal Beach, Calif. 90740

[21] Appl. No.: 121,943

[22] Filed: Nov. 18, 1987

Related U.S. Application Data

[63] Continuation-in-part of Ser. No. 758,094, Jul. 23, 1985, abandoned.

[51] Int. Cl.$^4$ .............................................. A01D 34/74
[52] U.S. Cl. .................................. 56/17.2; 280/43.13
[58] Field of Search ..................... 56/17.2, 17.1, 208, 56/255; 280/43.13, 43.17, 43.20; 172/400, 401

[56] References Cited

U.S. PATENT DOCUMENTS

| | | | |
|---|---|---|---|
| 2,263,368 | 11/1941 | Sejkora | 280/44 |
| 2,568,822 | 9/1951 | Pervis | 56/17.2 |
| 2,608,043 | 8/1952 | Berdan | 56/17.2 |
| 2,730,374 | 1/1956 | Rogers et al. | 280/44 |
| 2,848,859 | 8/1958 | Abel | 56/17.2 |
| 2,934,875 | 5/1960 | Katzfey | 56/17.2 |
| 3,093,947 | 6/1963 | Whitman | 56/17.2 |
| 3,161,006 | 12/1964 | Willette et al. | 56/17.2 |
| 3,172,218 | 3/1965 | Constantin | 37/153 |
| 3,217,474 | 11/1965 | Neilson | 56/17.2 |
| 3,269,100 | 8/1966 | Smith | 56/17.2 |
| 3,303,524 | 2/1967 | Schneider | 15/49 |
| 3,357,715 | 12/1967 | Planper et al. | 280/43.13 |
| 3,544,127 | 12/1970 | Dobson | 280/43.17 |
| 3,677,574 | 7/1972 | Cyr | 280/43.13 |
| 3,874,151 | 4/1975 | Seifert et al. | 56/17.2 |
| 3,972,160 | 8/1976 | Baswell | 56/17.2 |
| 4,077,191 | 3/1978 | Pittinger et al. | 56/17.2 |
| 4,167,093 | 9/1979 | Pfeiffer et al. | 56/17.2 |
| 4,321,784 | 3/1982 | Wood et al. | 56/17.2 |

FOREIGN PATENT DOCUMENTS

| | | | |
|---|---|---|---|
| 217074 | 1/1957 | Australia | 56/17.2 |
| 229636 | 1/1959 | Australia | 56/17.2 |
| 230223 | 8/1959 | Australia . | |
| 2328599 | 1/1975 | Fed. Rep. of Germany | 56/17.2 |
| 2478429 | 9/1981 | France | 56/17.2 |
| 845169 | 8/1960 | United Kingdom | 56/17.1 |
| 919689 | 2/1963 | United Kingdom . | |
| 2058535 | 4/1981 | United Kingdom . | |

Primary Examiner—John Weiss
Attorney, Agent, or Firm—Knobbe, Martens, Olson & Bear

[57] ABSTRACT

A lawn mower height adjustment linkage which is actuated by the rotation of a hand crank mounted on the mower's handle. The linkage raises or lowers the lawn mower deck relative to the ground by moving all four wheels of the mower simultaneously. The hand crank is threaded so that the mower height can be set at an infinite variety of positions. The location of the hand crank on the handle allows safe operation of the height adjustment linkage even when the mower is running. The wheels of the mower are mounted on bell cranks which are pivotably pinned to the mower so that rotation of the bell cranks will raise or lower the wheels relative to the mower. The bell crank corresponding to the left front wheel is linked to the hand crank through a connecting rod and a rotatable pivot arm, the pivot arm being mounted on the lawn mower handle. The motion of the connecting rod which rotates the left front bell crank is transmitted to the bell cranks of the remaining wheels through a plurality of bars which connect the bell cranks so that the height of all wheels are adjusted simultaneously. A height indicator is provided on the handle and is easily readable by the operator during operation.

21 Claims, 3 Drawing Sheets

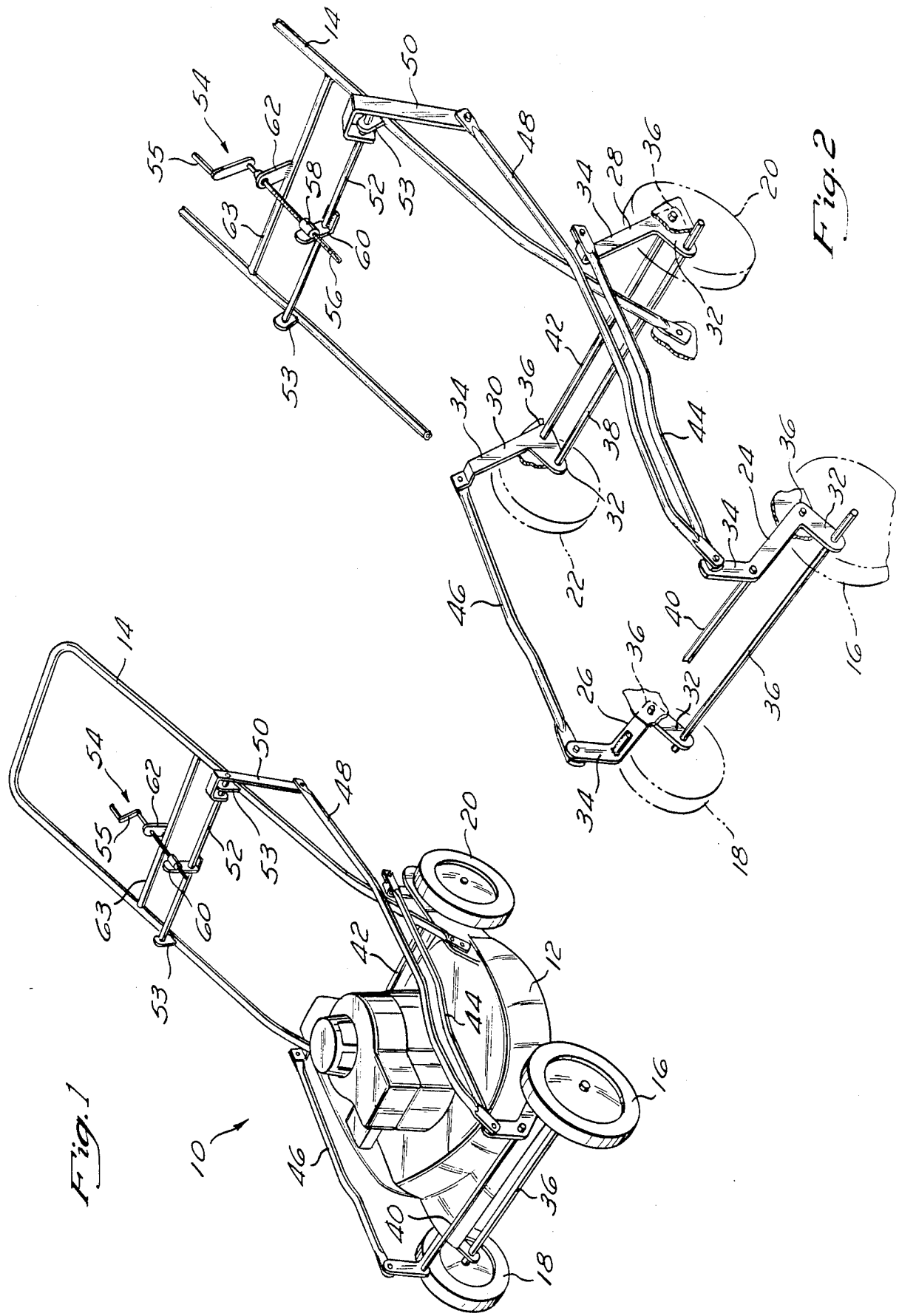

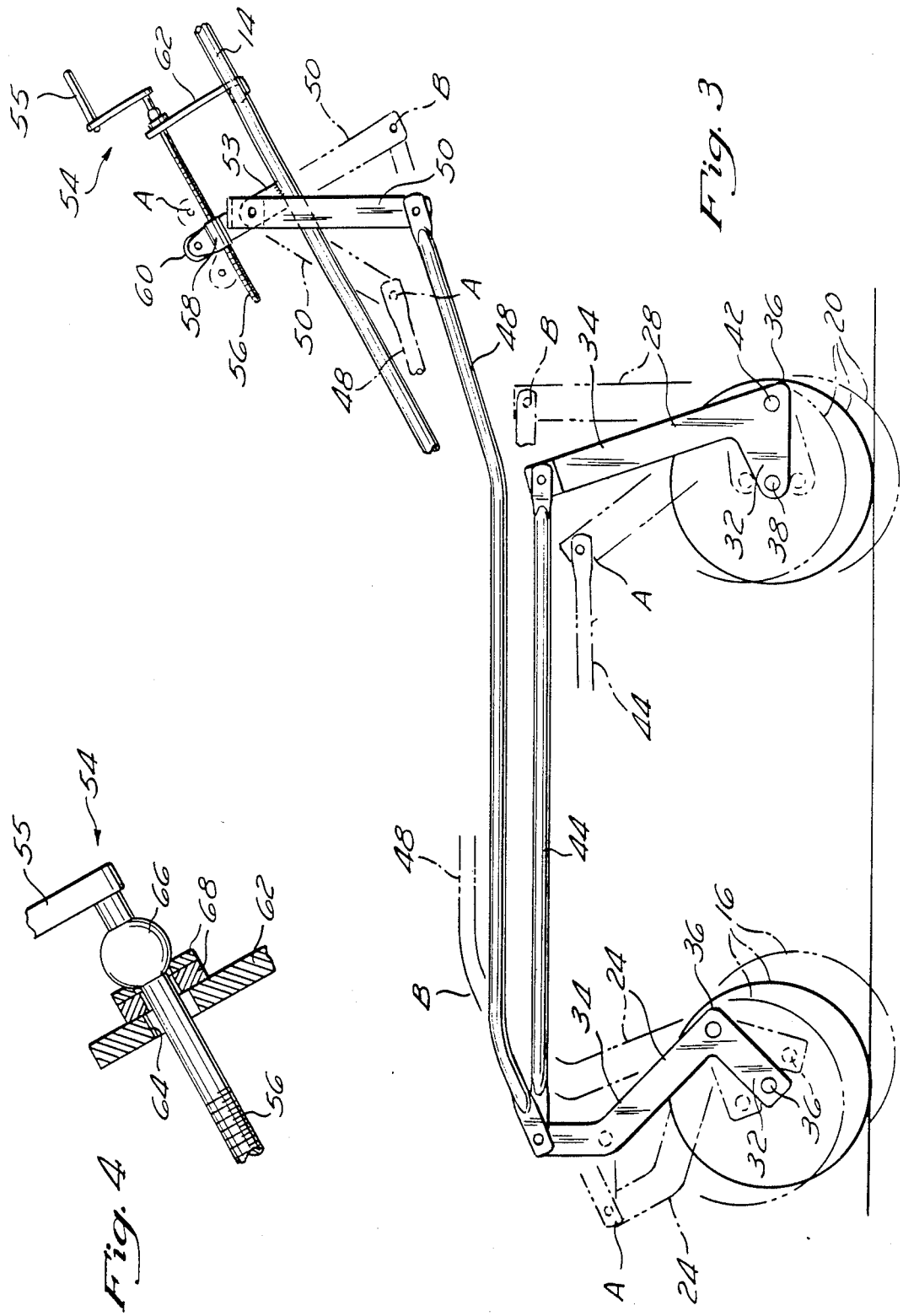

LAWN MOWER HEIGHT ADJUSTMENT LINKAGES

BACKGROUND OF THE INVENTION

This application is a continuation-in-part of Ser. No. 758,094, filed July 23, 1985 abandoned Dec. 16, 1987.

The present invention relates generally to lawn mowers, and more particularly to an apparatus for raising or lowering the height of a lawn mower relative to the ground, to vary the height at which grass is cut by the mower.

Generally, lawn mower height adjustment mechanisms have operated by varying the position of the mower wheels relative to the housing of the mower blade, or the deck. Most prior art systems have been unsatisfactory since the height of each wheel must be independently adjusted, requiring the operator of the mower to bend down and directly manipulate each wheel. Due to the proximity of the blade to the wheels, each time the height of the mower is adjusted, the mower engine must be turned off for safety reasons. Thus, adjusting the height of the mower becomes a time-consuming task.

Another drawback of mowers which have independently adjustable wheels is that it is possible for different wheels to be accidentally set at different heights, resulting in an uneven cutting by the mower. Further, most prior art systems enable the mower to be set only at one of a limited number of predetermined heights, thus limiting the usefulness of the mower where precise variations in the grass cutting height are desired.

Further, on prior lawn mowers having adjustable height mechanisms, it is difficult to accurately determine exactly how high the mower is set without actually cutting the grass first.

Some prior art devices allow simultaneous adjustment of all four wheels of a lawn mower, as shown in the patents to Abel (U.S. Pat. No. 2,848,859) and Rogers, et al. (U.S. Pat. No. 2,730,374). However, even the devices shown in Abel and Rogers only allow a height of the mower to be adjusted to a limited of incrementally varying settings.

Thus, a need exists for a lawn mower height adjustment mechanism which can be safely actuated while the mower is running and which simultaneously adjusts all four wheels to an infinite variety of height settings.

SUMMARY OF THE INVENTION

Briefly, the present invention is a height adjustment apparatus for a wheeled vehicle, such as a lawn mower. The wheels of the mower are mounted an cranks which are pivotably secured to the deck of the lawn mower so that rotating a crank moves the corresponding wheel relative to the deck, and results in a raising or lowering of the deck relative to the ground.

The cranks by which the wheels are secured to the mower preferably are L-shaped bell cranks, each having two legs which are joined at an apex. The apex of each bell crank is pivotably fixed to the lawn mower deck, and an axle passes through the end of a first leg.

The height adjustment apparatus further comprises a linkage for transmitting the motion of one crank to the cranks of the remaining wheels. This linkage includes a crossbar connecting the bell cranks of the front wheels, a crossbar connecting the bell cranks of the rear wheels, and bars on either side of the mower connecting each front wheel bell crank with the respective rear wheel bell crank on that side. Further, the front wheels are joined together through a straight axle which extends through both front wheel cranks. Also, a straight rear axle passes through both rear bell cranks to join the rear wheels. Thus, all wheels of the mower move simultaneously so that the mower remains level.

A substantially horizontal connecting rod is pivotably attached to one of the cranks so that forward or backward movement of the connecting rod will rotate that crank. Preferably, the connecting rod is secured to the end of a second leg of one of the cranks which is used mount one of the front wheels of the mower. The height adjustment linkage also includes a means for adjustably controlling the movement of the connecting rod so that the lawn mower can be raised or lowered to an infinite variety of desired levels.

Preferably, motion of the connecting rod is controlled by attaching one end of the connecting rod to a pivot arm which is rotably mounted on the mower's handle and extends beneath the handle to a position where rotation of the pivot arm will cause motion of the connecting rod to vary the height of the mower. A rotatable bar which extends across the handle is fixed to the pivot arm so that rotation of the bar results in rotation of the pivot arm. The pivot arm and pivot bar are rotated by means of a hand crank which has a threaded stem. A threaded member extends from the pivot arm so that when the hand crank is threaded into the threaded member, the pivot arm is rotated. The hand crank is also secured to the handle of the mower, so that the crank can be rotated to actuate the linkage while the mower is running, without risking injury to the operator of the mower.

Another feature of the invention is a mower height indicator which is mounted on the handle of the mower for easy viewing during operation. Preferably, the height indicator comprises a removable cover mounted in a stationary position on the rotatable bar extending across the handle. An indicator is also secured to the rotatable bar so that it is stationary relative to the bar. The indicator points to indicial markings on the cover corresponding to the height of the mower blade. Advantageously, the orientation of the indicator relative to the rotatable bar can be adjusted so as to accurately calibrate the height indicator.

BRIEF DESCRIPTION OF THE DRAWINGS

FIG. 1 is a perspective view of a lawn mower incorporating the present height adjustment linkage.

FIG. 2 is a partially cut-away perspective view of the lawn mower shown in FIG. 1.

FIG. 3 is partially cut-away side elevation of the height adjustment linkage found in FIG. 1, with the positioning of the linkage at various heights shown in broken lines.

FIG. 4 is a side elevation of a hand crank as mounted on the lawn mower handle.

DETAILED DESCRIPTION OF THE PREFERRED EMBODIMENT

Figure 5:
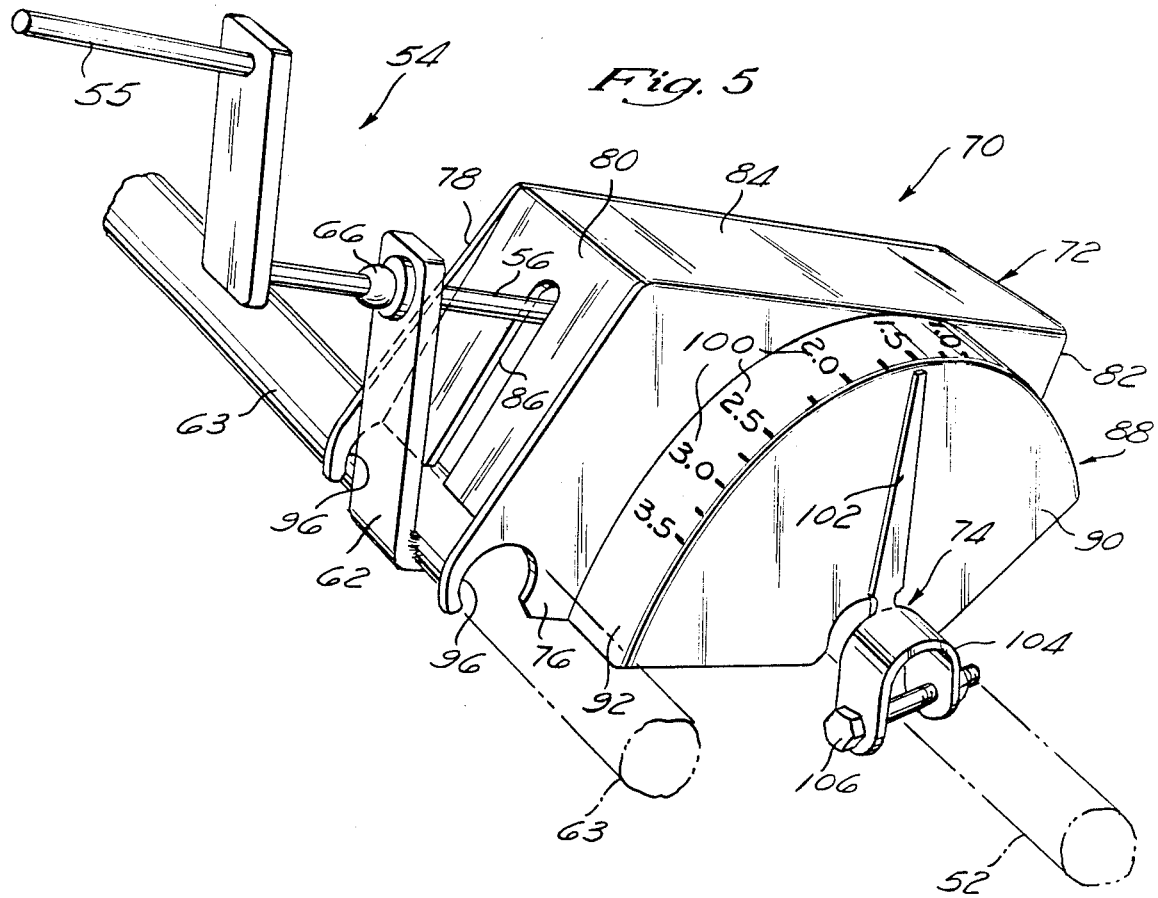
FIG. 5 is a partial perspective view of the handle of a lawn mower incorporating the height indicator of the present invention.

The present height adjustment apparatus is shown on a lawn mower 10 in FIG. 1. The mower 10 includes a deck 12 which houses the mower blade (not shown), a U-shaped handle 14 which is affixed at the rear end of the deck 12, and a plurality of wheels 16, 18, 20 and 22 which suspend the deck 12 above the ground. The wheels 16, 18, 20 and 22 are located at each of the four corners of the deck 12. Located at the left and right front corners of the deck 12 are the left front wheel 18 and the right front wheel 20. Likewise, a left rear wheel 20 and a right rear wheel 22 are at the left and right rear corners of the deck 12.

The wheels 16, 18, 20 and 22 of the mower 10 are mounted on the deck 12 by a left front crank 24, right front crank 26, left rear crank 28 and right rear crank 30, respectively. Preferably, the cranks 24, 26, 28 and 30 are L-shaped bell cranks, each having a lower leg 32 and an upper leg 34 which are joined at an apex 36. Each of the bell cranks 24, 26, 28 and 30 is pivotably hinged to the deck 12 at its apex 36. As shown in FIG. 3, rotation of the bell cranks about their apices 36 results in the raising or lowering of the wheels 16, 18, 20 and 22 relative to the deck 12, thus changing the vertical height of the deck 12.

The front wheels 16 and 18 are joined by a straight front axle 36 which extends through respective apertures in the lower legs 32 of the front bell cranks 24 and 26. Similarly, a straight rear axle 38 extends through apertures in the ends of the lower legs 32 of the rear bell cranks 28 and 30. Preferably, the axles 36 and 38 are rotatable within the bell crank lower legs 32. Also extending between the front bell cranks 24 and 26 is a front crossbar 40. A rear crossbar 42 connects the rear bell cranks 28 and 30. Since the front bell cranks 24 and 26 are joined by the front axle 36 and front crossbar 40, the front wheels 16 and 18 will move in unison. Due to the rear axle 38 and rear crossbar 42, the rear wheels 20 and 22 will also move in unison, to maintain the mower 10 level at all times.

To coordinate movement of the front bell cranks 24 and 26 and the rear bell cranks 28 and 30, a left side bar 44 is attached between the upper legs 34 of the left front bell crank 24 and the left rear bell rank 28. A right side bar 46 is similarly located on the right side of the mower 10.

Alternatively, each of the wheels 16, 18, 20 and 22 can be mounted on a short, independent axle (not shown), extending from the corresponding bell crank lower leg 32. Since such an axle would not be shared with a second wheel, crossbars 40 and 42 or the like would be necessary to insure simultaneous motion of each set of wheels.

One end of a horizontally oriented connecting rod 48 is pivotably secured to the end of one of the bell crank upper legs 34. Preferably, the connecting rod is secured to a front bell crank, and is shown attched to the left front bell crank 24. Forward or backward motion of the connecting rod 48 rotates the left front bell crank 24 to raise or lower the wheel 16. As will be apparent to those skilled in the art, the connecting rod 48 may alternatively be secured to any other bell crank upper leg 34 since the crossbars 38 and 40, axles 36 and 38, and side bars 44 and 46 serve to coordinate the motion of all four wheels 16, 18, 20 and 22.

The connecting rod 48 is pivotably secured at its other end to a pivot arm 50 which is rotatably fixed to the handle 14 so as to impart a forward or backward motion to the connecting rod 48 upon rotation. Preferably, the pivot arm 50 is mounted on the handle 14 by means of a rotatable pivot bar 52 which extends across the handle 14, and is pivotably secured at either end to the legs of the U-shaped handle 14 by trunions 53 extending upwardly from the handle 14. The pivot bar 52 is positioned at approximately the midpoint between the front and rear ends of the handle 14. The pivot arm 50 is secured to one end of the pivot bar 52 and protrudes radially outward, or laterally, from the bar 52, to extend beneath the handle 14.

Rotation of the pivot arm 50, and thus motion of the connecting rod 48, rotation of the bell cranks 24, 26, 28 and 30 and, ultimately, movement of deck 12 relative to the ground, is controlled by a hand crank 54 mounted on the mower handle 14. The hand crank 54 includes an L-shaped hand lever 55 and an elongated, threaded stem 56 extending from the lever 55. The threaded stem 56 feeds into a threaded bushing 58 which is rotatably pinned to a central arm 60 that extends radially outward from the pivot bar 52 to allow mutual pivoting of the arm 60 and bushing 58.

As is best shown in FIG. 4, the hand crank 54 is further secured to the handle 14 by means of a plate 62 extending upwardly from a crossbar 63 spanning the legs of the handle 14. The stem 56 passes through an aperture 64 in the plate 62. The aperture 64 has a larger diameter than the stem 56 to provide clearance between the stem 56 and the plate 62. A ball 66 having a diameter greater than the aperture 64 is integral with the stem 56 at the end of the stem 56 adjoining the lever 55. The ball 66 bears against a pair of washers 68 which rest against the plate 62 to support the hand crank 54 on the plate 62 so that the stem 56 does not slide through the aperture 64 to the point where the lever 55 contacts the plate 62. The ball 66 also promotes low friction rotation of the stem 56 within the aperture 64.

In operation, the hand crank 54 is manually rotated in order to adjust the mower 10 to a desired height for cutting grass. Since the hand crank 54 is positioned on the handle 14, far from the underside of the deck 12, where the mower blade is located, the hand crank 54 is safely accessible while the mower 10 is running. Further, the location of the hand crank 54 does not require the user to lean over or bend down to actuate the height adjustment linkage.

As is best shown in FIG. 3, when the hand crank 54 rotates, the stem 56 feeds into the bushing 58 and forces the bushing 58 axially along the stem 56. The direction of motion of the bushing 58 depends on the direction of the crank's 54 rotation. The bushing 58 is pinned to the central arm 60 and travel of the bushing 58 causes the central arm 60 to follow the bushing 58. The central arm 60 is rigidly fixed to the pivot bar 52 so that motion of the central arm 60 causes the pivot arm 52 to rotate, and likewise, causes rotation of the pivot arm 50 about the pivot bar 52.

Rotation of the pivot arm 50 is translated into forward or backward motion of the connecting rod 48 in a substantially horizontal plane. The pivot arm 50 is longer than the central arm 60 and acts as a lever in multiplying the short travel of the bushing 58 into the longer motion of the connecting rod 48. The movement of the connecting rod 48 rotates the left front bell crank 24 about its apex 36, and thus raises or lowers the left front wheel 16. The driving motion of the connecting rod 48 is transmitted to the remaining wheels 18, 20 and 22 through the crossbars 40 and 42, and the side bars 44 and 46 so that all four wheels are adjusted simultaneously to raise or lower the mower 10 evenly.

As discussed above, the connecting rod 48 is preferably secured to a front bell crank 24, 26. The connecting rod 48 is thus longer than if it extended only to a rear bell crank 28, 30. As a result, rotation of the connecting rod 48 in a vertical plane is minimized as the connecting rod 48 moves forward and backward. The less the connecting rod 48 rotates, the smaller is the amount of non-productive force acting on the front bell crank upper leg 34 (i.e., the force component normal to the direction of motion of the upper leg 34). The connecting rod 48 can thus drive the bell crank 24 through a wide range of motion without binding due to the rotation of the connecting rod 48. Again referring to FIG. 3, rotation of the hand crank 54 in one direction results in forward motion of the connecting rod 48, as indicated in broken lines at position A. Forward motion of the bell cranks 24 and 28 to position A causes the mower 10 to be raised to a higher position. Conversely, rotation of the hand crank 54 in the opposite direction will draw the connecting rod 48 backwards to position B, moving bell cranks 24 and 28 to position B and lowering the height of the mower 10.

The threaded stem 56 allows the hand crank 54 to be rotated any desired number of times to result in an unlimited number of mower height settings. Thus, the mower 10 can be used to cut grass to any desired height. In addition to varying the mower height when manually actuated, the hand crank 54 and bushing 58 cooperate to maintain the mower 10 at any desired height setting. The gravitational tendency of the desk 12 to drop down to ground level is transmitted to be bushing 58 and stem 56 through the linkage described herein. However, the pitch of the threading on the stem 56 and inside the bushing 58 is such that this force will not cause the stem 56 to rotate and thread out of the bushing 58 unless a manual rotational force is first applied to the hand crank 54.

As the bushing 58 threads along the hand crank stem 56, the orientation of the stem 56 changes relative to the mower handle 14 and plate 62. Due to the oversized aperture 64, there is clearance between the plate 62 and stem 56 to allow for various angular orientations of the stem 56. Also, the stem 56 rotates freely despite variations in its orientation since the spherical ball 66 remains in contact with the washers 68.

It is to be understood that the linkage disclosed herein can be actuated by means other than the illustrated hand crank 54. Additionally, the exact location on the mower of the hand crank 54 or other actuating means may be varied while remaining within the scope of the invention.

Figure 6:
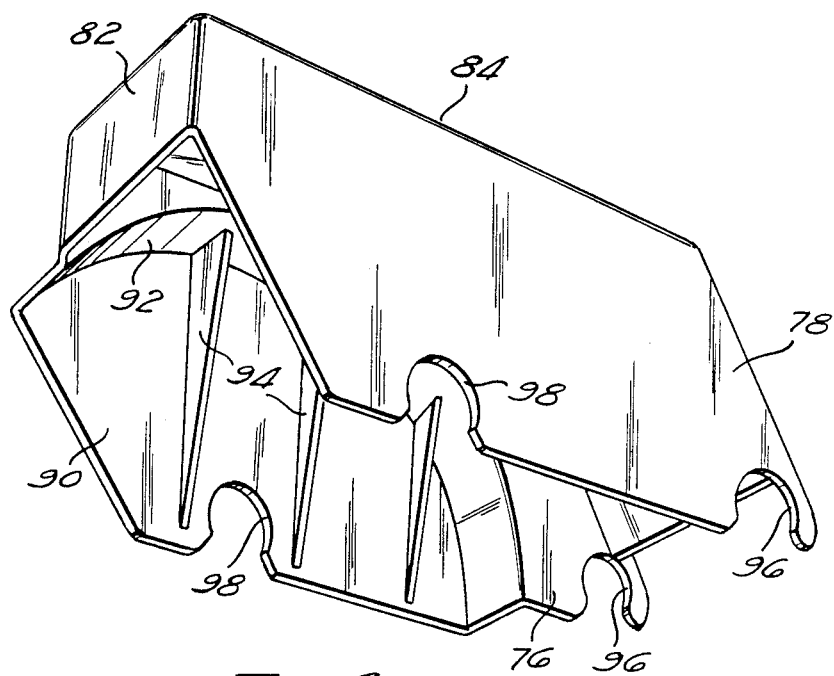
FIG. 6 is a perspective view of the underside of the cover portion of the height indicator shown in FIG. 5.

Another feature of the invention is a height indicator 70, shown in FIG. 5. The height indicator 70 includes a cover 72 and an indicator member 74. The cover 72 is also illustrated in FIG. 6, and is formed from a pair of substantially parallel side walls 76, 78 which are spanned by a front wall 80 and a rear wall 82. The side walls 76, 78, front wall 80 and rear wall 82 depend from a substantially rectangular top wall 84. A slot 84 extends through the front wall 80 to allow the threaded stem 56 of the hand crank 54 to pass therethrough. The walls are generally planar with the exception of the side wall 76, from which an arcuate projection 88 extends. The projection 88 is formed by a wall 90 which is substantially parallel to the side wall 76, and which is joined to the side wall 76 by an arcuate upper surface 92. As seen in FIG. 6 reinforcing ribs 94 extend between the upper surface 92 and the wall 90.

The side walls 76, 78 each include a front aperture proximate the front wall 80. The apertures 96 are aligned to permit the cross bar 63 to extend through both apertures 96. Preferably, the cover 72 is formed from a polymer which has sufficient resilience to enable the cross bar 63 to be removably snap-fit into the apertures 96. The side wall 78 and wall 90 also include a pair of aligned front apertures 98 through which the pivot bar 52 rotatably extends and is removably snap-fit. When the cross bar 63 and the pivot bar 52 are fit into the apertures 96, 98, the cover 7 is stationary relative to the handle 14 of the lawn mower 10. When mounted on the handle 14, the cover 72 also partially encloses the hand crank 54 and the threaded bushing 58, thus protecting them from the elements.

A series of indicial markings 100 are provided on the upper surface 92, and preferably include numerical indicia which represent, in inches, the height of the lawn mower 10. The indicator member 74 has an elongate pointer member 102 which extends radially outward from the pivot arm 52. One end of the pointer 102 terminates adjacent the indicial markings 100. The particular indicial marking 100 at which the pointer 102 points corresponds to the actual height of the grass after it is cut by the mower 10. This is achieved by joining the pointer 102 to the pivot bar 52 with a U-shaped clamp 104 which is joined to the other end of the pointer 102 and surrounds the pivot bar 52. A bolt 106 extends through the clamp 104 to removably secure the indicator member 74 to the pivot bar 52 so that the pointer 102 is stationary relative to the pivot bar 52. As the height of the mower 10 is varied by rotating the hand crank 54, the pivot bar 52 and pointer 102 are caused to rotate as well. Thus, the height setting indicated by the pointer 102 automatically varies throughout an infinite variety of height settings as the height of the mower is changed. Due to the position of the cover 72 on the handle 14, the height of the mower shown by the pointer 102 and indicial markings 100 are easily read, without the operator having to bend over to visually inspect the mower height.

The height indicator 70 can be easily calibrated to compensate for variations between different lawn mowers. In particular, by loosening the bolt 106, the indicator member 74 can be rotated relative to the pivot bar 52, thus causing angular displacement of the pointer 102. When the pointer 102 correctly indicates the actual height of the mower 10, the bolt 106 can be tightened, clamping the indicator member 102 into a stationary position relative to the pivot bar 52.

What is claimed is:

1. A height adjustment apparatus for raising and lowering the deck of a lawn mower relative to the ground, said lawn mower including a deck, a pair of front wheels, a pair of rear wheels and a handle, said apparatus comprising:

a rotatable hand crank mounted on the handle, said hand crank having a threaded stem for adjusting the height of the deck through a continuous range to an unlimited number of desired settings;

a pivot arm having first and second ends, said first end rotatably attached to said handle of said lawn mower at a pivot location such that said arm extends downwardly from said handle, with said second end disposed substantially below said pivot location;

a threaded member into which said hand crank stem feeds;

means for mechanically coupling said threaded member to said pivot arm to transmit rotation of said hand crank into rotation of said pivot arm;

a connecting rod pivotably secured to said second end of said pivot arm, said connecting rod oriented substantially horizontally, wherein a rotational force is applied to said first end of said pivot arm so that rotation of said pivot arm about arm about said pivot location drives said connecting rod to move in a generally horizontal direction;

a pair of L-shaped bell cranks for mounting said pair of front wheels, respectively, and a pair of rear L-shaped bell cranks for mounting said pair of rear wheels, respectively, each of said cranks including first and second legs joined at an apex, each of said cranks pivotably pinned to the deck at said apex and having a respective one of said wheels rotatably mounted on said first leg, said horizontally oriented connecting rod being pivotably secured to the second leg of one of said bell cranks, said second leg extending substantially vertically upward from said apex so that said horizontal driving movement of said connecting rod drives said one of said bell cranks to pivot relative to the deck; and means for mechanically interconnecting said bell cranks to transmit the motion of said connecting rod from said one of said bell cranks to the other bell cranks so that, upon rotation of the hand crank, all wheels move simultaneously through a continuous range of positions to raise and lower the entire deck evenly, said transmitting means comprising plural rods which connect each of said bell cranks with another of said bell cranks, wherein one of said rods is substantially rigid and is pivotably secured at one end of one of said front bell cranks and is pivotably secured at another end to one of said rear bell cranks so that said front and rear wheels are raised and lowered together.

2. The apparatus of claim 1, wherein one of said rods comprises an axle which mounts both of said front wheels, and another of said rods comprises an axle which mounts both of said rear wheels.

3. The apparatus of claim 1, wherein one of said rods comprises a front crossbar connected between the front pair of said bell cranks so that the front pair of bell cranks move in unison, and another of said rods comprises a rear crossbar connected between the rear pair of bell cranks so that said rear pair of bell cranks move in unison.

4. The apparatus of claim 1, wherein said mechanical coupling means comprises a pivot bar for mounting said threaded member, said pivot bar being rotatably secured to said handle, and said pivot arm being attached to one end of said pivot bar, said hand crank stem threaded into said threaded member so that rotation of said hand crank causes said pivot bar and pivot arm to be rotated.

5. The apparatus of claim 1, further comprising a height indicator, said height indicator comprising:

a cover portion secured to said handle in a stationary position relative to said handle;

an indicator member mounted on said mechanically coupling means, adjacent said cover, so as to rotate relative to said cover corresponding to rotation of said pivot arm; and indicial markings on said cover, said indicator member pointing to said indicial markings to represent the actual height of said mower.

6. The apparatus of claim 5, wherein said cover at least partially encloses said mechanical coupling means.

7. A continuously variable height adjustment apparatus for adjusting the height of the deck of a lawn mower relative to the ground, said lawn mower resting on wheels, and including a handle for controlling the direction of travel of said mower by user, said apparatus comprising:

a first L-shaped bell crank means pivotally attached to said lawn mower deck to mount a first wheel of said mower, said first wheel having an axle which extends through said crank means so that rotating said crank means moves said first wheel relative to said deck and results in a raising or lowering of said deck;

second, third and fourth L-shaped bell crank means for mounting second, third and fourth wheels of said mower, respectively, said first, second, third and fourth crank means interconnected to rotate in unison in response to rotation of said first crank means;

a substantially horizontally oriented connectintg rod having one end pivotally attached to said first crank means such that longitudinal movement of said connecting rod causes rotation of said first crank means;

a pivot bar rotatably horizontally mounted on said handle;

a pivot arm having a first end secured to said pivot bar and extending radially downwardly therefrom, the other end of said connecting rod being pivotably attached to a second end of said pivot arm such that said connecting rod is disposed generally horizontally, wherein a rotational force is applied to said pivot arm by said pivot bar at said first end of said pivot arm, said first end being opposite said second end attached to said connecting rod to cause said pivot arm to drive said connecting rod in a substantially horizontal direction upon rotation of said pivot bar;

a threaded member pivotably attached to said pivot bar;

a hand crank rotatably attached to said lawn mower handle in a position to be manually rotated without requiring bending by an operator, said hand crank having a threaded stem which feeds into said threaded member so that rotation of said hand crank displaces said threaded member and causes rotation of said pivot bar and said pivot arm so as to continuously variably drive said connecting rod in a substantially horizontal direction to position the height of said deck to any desired level within a continuously variable range of desired levels.

8. The apparatus of claim 7, wherein the apex of said first bell crank is pinned to the front of said deck, said first bell crank having first and second legs which form said L-shaped, said axle and said connecting rod being pinned to said first and second legs of said bell crank, respectively.

9. The apparatus of claim 6, further comprising a height indicator, said height indicator comprising:

a cover secured to said handle in a stationary position relative to said handle;

an indicator extending radially outward from said pivot bar, said indicator member being secured to said pivot bar such that rotation of said pivot bar causes rotation of said indicator member corresponding to the height change of said mower; and indicial markings on said cover, said indicator member pointing to said indicial markings to represent the actual height of the mower.

10. The apparatus of claim 9, wherein said cover at least partially encloses said threaded stem and said threaded member.

11. The appartus of claim 9, wherein said cover includes a slot through which said stem protrudes.

12. The apparatus of claim 9, wherein said cover is removably secured to said handle.

13. The apparatus of claim 12, wherein said pivot bar extends through said cover and is rotatably relative thereto.

14. The apparatus of claim 6, wherein said indicator member is secured to said pivot bar by means of a clamp, such that is angular orientation of said indicator member realtive to said pivot bar can be varied to calibrate said height indicator.

15. In a lawn mower having a handle for controlling the direction of travel of said mower, said mower including front and rear wheels mounted on respective cranks, each of said cranks pivotally mounted on a housing of said mower to permit adjustment of the position of the wheels relative to the housing by pivoting said cranks, said cranks being interconnected to allow simultaneous adjustment of the front wheels and the rear wheels, a drive mechanism for continuously variably, simultaneously adjusting said wheels, comprising:
 a pivot bar, rotatably mounted on said handle;
 a first pivot arm, fixedly attached to project laterally from said pivot bar;
 a second pivot arm, fixedly attched to project laterally from said pivot bar;
 a connecting rod connecting one of said cranks with said first pivot arm at a pivot point disposed on said first pivot arm by a first distance from said pivot bar; and
 means for driving said second pivot arm to rotate said pivot bar and thereby drive said connecting rod, said driving means connected to drive said second pivot arm at a point disposed on said second pivot arm by a second distance from said pivot bar, said first distance substantially longer than said second distance to cause the displacement of said first pivot point to be substantially greater than the displacement of said second pivot point for a given amount of rotation of said pivot bar to cause movement of said connecting rod to be amplified, said movement of said connecting rod providing a continuously variable simultaneous adjustment of said front and rear wheels.

16. A drive mechanism as defined by claim 15, wherein said driving means comprises a hand crank having a threaded stem and a threaded member, said threaded member being pivotally attached to said second arm at said pivot point so as to theadedly receive said stem.

17. A drive mechanism as defined by claim 16, wherein said stem is mounted on a support member attached to said handle, said support member having an aperture therein, said aperture being substantially larger than the diameter of said stem, said stem extending through said aperture and including a ball portion disposed such that said support member is between said ball and said threaded member, said ball portion being larger than said aperture to prevent said stem from passing therethrough while accommodating lateral movement of said stem relative to said support member.

18. A lawn mower, comprising:
 a housing having a deck for mounting a motor;
 a handle attached to said housing for controlling the direction of said mower;
 a pluraltiy of wheels mounted on said mower;
 means for pivotably mounting said wheels on said mower to permit said wheels to move relative to said housing to adjust the height of said housing relative to the ground;
 a connecting rod secured to said mounting means;
 means for driving said connecting rod, said driving means mounted on said handle; and
 means for indicating the height of said housing, said indicator means mounted on said handle and comprised of an indicator member secured to said driving means, said driving means causing said indicator member to rotate as said housing is raised and lowered by said driving means, said height indicating means further comprising indicial markings fixed on said handle, said indicator member pointing to said indicial markings to represent the actual height of said housing throughout a continuous and infinite variety of height setting, said indicator member further comprising means for securing said indicator member to said driving means, wherein the angular orientation of said indicator member relative to said driving means may be varied to calibrate said height indicating means.

19. The lawn mower of claim 18, wherein said height indicating means further comprises a cover which at least partially encloses said driving means, said indicial markings being formed on said cover.

20. The lawn mower of claim 19, wherein said driving means comprises:
 a pivot bar mounted on said handle, said pivot bar being rotatably driven by said driving means; and
 a pivot arm fixed to one end of said pivot bar, said pivot arm joined to said connecting rod, and wherein said cover includes at least one aperture, said pivot bar extending through said aperture and rotating relative to said cover.

21. The lawn mower of claim 20, wherein said cover is removably secured to said handle, said aperture sized to removably snap-fit onto said pivot bar, said cover further comprising a second aperture sized to snap-fit onto a stationary crossbar extending across said handle.

* * * * *

UNITED STATES PATENT AND TRADEMARK OFFICE
CERTIFICATE OF CORRECTION

PATENT NO. : 4,835,952
DATED : June 6, 1989
INVENTOR(S) : Frank E. McLane

It is certified that error appears in the above-indentified patent and that said Letters Patent is hereby corrected as shown below:

Column 1, line 42, change "limited of" to --limited number of--

Column 1, line 52, change "mounted an cranks" to --mounted on cranks--

Column 2, line 3, change "front wheel cranks" to --front wheel bell cranks--

Column 2, line 12, change "is used mount" to --is used to mount--

Column 2, line 53, change "Figure 3 is partially" to --Figure 3 is a partially--

Column 5, line 30, change "of the desk 12" to --of the deck 12--

Column 5, line 31, change "to be bushing" to -- to the bushing--

Column 6, line 1, change "front aperature proximate" to --front aperature 96--

Column 6, line 11, change "the cover 7" to --the cover 72--

Column 6, line 38, change "mower showen" to --mower shown--

UNITED STATES PATENT AND TRADEMARK OFFICE
CERTIFICATE OF CORRECTION

PATENT NO. : 4,835,952
DATED : June 6, 1989
INVENTOR(S) : Frank E. McLane

It is certified that error appears in the above-indentified patent and that said Letters Patent is hereby corrected as shown below:

Column 7, line 8, change "pivot arm about arm about said" to --pivot arm about said--.

Column 7, line 35, change "of one of said" to --to one of said--

Column 8, line 56, change "said first bell crank" to --said bell crank--

Column 9, line 16, change "such that is" to --such that the---

Signed and Sealed this

Nineteenth Day of October, 1993

Attest:

BRUCE LEHMAN

Attesting Officer

Commissioner of Patents and Trademarks